United States Patent [19]

Harara et al.

[11] Patent Number: 4,930,082

[45] Date of Patent: May 29, 1990

[54] CONTROL APPARATUS FOR A VEHICULAR SUSPENSION SYSTEM

[75] Inventors: Mitsuhiko Harara; Shozo Takizawa; Tadao Tanaka, all of Okazaki; Shunichi Wada, Himeji, all of Japan

[73] Assignees: Mitsubishi Jidosha Kogyo Kabushiki Kaisha; Mitsubishi Denki Kabushiki Kaisha, both of Tokyo, Japan

[21] Appl. No.: 353,625

[22] PCT Filed: Jul. 27, 1988

[86] PCT No.: PCT/JP88/00754

§ 371 Date: Mar. 6, 1989

§ 102(e) Date: Mar. 6, 1989

[87] PCT Pub. No.: WO89/00927

PCT Pub. Date: Feb. 9, 1989

[30] Foreign Application Priority Data

Jul. 28, 1987 [JP] Japan .................................. 62-189383

[51] Int. Cl.$^5$ .................................................. B60G 17/00
[52] U.S. Cl. ................................. 364/424.05; 280/707
[58] Field of Search .................... 364/424.05; 280/707, 280/840, 772, 703, DIG. 1

[56] References Cited

U.S. PATENT DOCUMENTS

| | | | |
|---|---|---|---|
| 4,621,833 | 11/1986 | Soltis | 280/707 |
| 4,648,622 | 3/1987 | Wada et al. | 280/707 |
| 4,712,807 | 12/1987 | Kurosawa | 364/424.05 |
| 4,761,022 | 8/1988 | Ohashi et al. | 280/772 |
| 4,765,649 | 8/1988 | Ikemoto et al. | 280/707 |
| 4,803,627 | 2/1989 | Yasuike et al. | 280/707 |

FOREIGN PATENT DOCUMENTS

| | | |
|---|---|---|
| 0152914 | 3/1985 | European Pat. Off. . |
| 34808 | 2/1987 | Japan . |
| 2155206 | 4/1985 | United Kingdom . |
| 2155206A | 9/1985 | United Kingdom . |

Primary Examiner—Gary Chin
Attorney, Agent, or Firm—Sughrue, Mion, Zinn, Macpeak & Seas

[57] ABSTRACT

Disclosed is a control apparatus for a vehicular suspension system having a plurality of suspension units each disposed between a road wheel and the body of a vehicle for suspending the corresponding road wheel from the vehicle body. The control apparatus includes a control unit which is connected to receive the output signals from an acceleration sensor, a vehicle-speed sensor and a steering sensor for calculating the rolling state of the vehicle due to a transverse acceleration thereof and controlling the respective suspension units based on the calculated rolling state of the vehicle so as to suppress the rolling thereof. The control apparatus further includes a drift compensator for compensating for a drift of a neutral point of the output signal of the acceleration sensor based on the output signals from the acceleration sensor, the vehicle-speed sensor and the steering sensor signal of the acceleration sensor based on the output signals from the acceleration sensor, the vehicle-speed sensor and the steering sensor.

6 Claims, 5 Drawing Sheets

LEFT TURN  NEUTRAL  RIGHT TURN

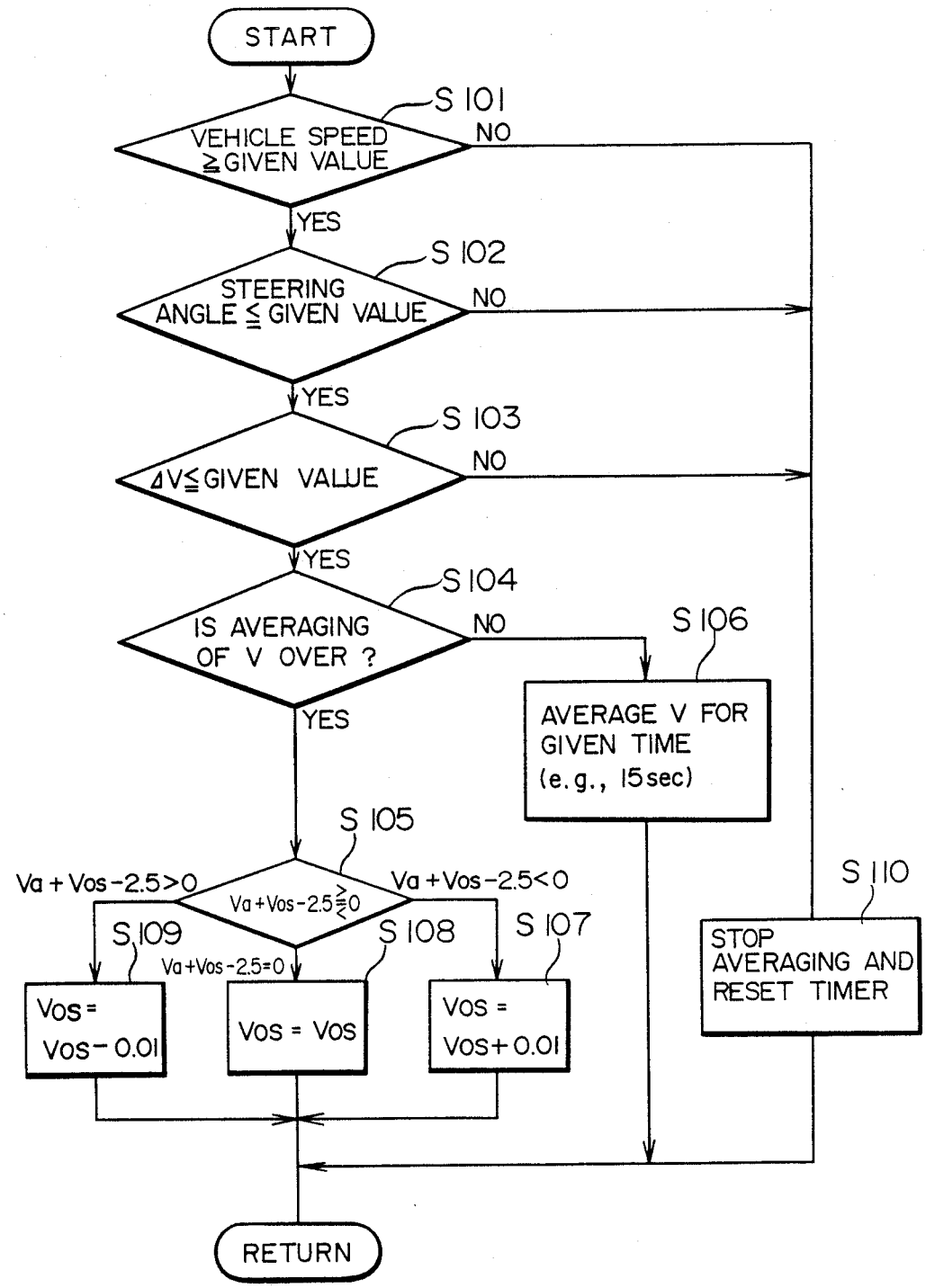

CONTROL APPARATUS FOR A VEHICULAR SUSPENSION SYSTEM

TECHNICAL FIELD

The present invention relates generally to a vehicular suspension system and, more particularly, to a control apparatus for controlling the operation of such a suspension system so as to suppress rolling and nose dive of a vehicle.

BACKGROUND ART

In the past, many suspension control apparatus of this type have been known, some examples of which are disclosed in Japanese Utility Model Laid-Open No. 61-163710 or Japanese Patent Laid-Open No. 62-34808. In these conventional suspension control apparatus, a fuild spring chamber such as a pneumatic spring chamber is interposed between each road wheel and the body of a vehicle so that supply to and discharge from the fluid spring chamber of compressed air is controlled in an appropriate manner to suppress rolling of the vehicle body. Specifically, there is a tendency that when a vehicle is steered to turn, the suspension units disposed on the turning side of the vehicle are forced to contract under the action of centrifugal force whereas those on the opposite side thereof expand. In order to suppress this tendency, a predetermined amount of compressed air is supplied to the fluid spring chamber of each of the suspension units on the contracted side, and at the same time a predetermined amount of presure air is discharged from the fluid spring chamber of each of the suspension units on the expanded side so as to incline the vehicle body in the opposite direction, thereby maintaining the attitude of the vehicle body in a horizontal manner.

Many control apparatus for vehicular suspension systems other than the above have also been studied and proposed which are intended to provide the same effects as described above by appropriately changing the damping force or spring constant of each suspension unit, or by regulating the operations of stabilizers.

With the above described conventional control apparatus for vehicular suspension systems, in cases where a transverse acceleration (i.e., an acceleration in a direction perpendicular to the longitudinal direction) of a vehicle is detected by an acceleration sensor so as to calculate the magnitude of rolling of the vehicle for control of the supply and discharge of compressed air or other suspension characteristics, it is required to precisely determine a neutral point on the basis of which the detection of vehicle acceleration in a transverse direction is effected. In the past, however, no correction or compensation has been made for such a neutral point with respect to the output of an acceleration sensor which is liable to change as time passes. As a consequence, there arises a problem that it is difficult to carry out roll-suppression control with a high level of preciseness over an extended period of time. Thus, it has been long desired to effect a correction or compensation of such a neutral point in an automatic fashion.

DISCLOSURE OF THE INVENTION

Accordingly, the present invention is intended to solve the above described problem encountered in the conventional apparatus.

It is an object of the present invention to provide a control apparatus for a vehicular suspension system which is capable of effecting precise roll-suppressing control in a stable manner over an extended period of time.

In order to achieve the above object, in accordance with the present invention, there is provided a control apparatus for a vehicular suspension system comprising: a plurality of suspension units each disposed between a road wheel and the body of a vehicle for suspending the corresponding road wheel from the vehicle body; an acceleration sensor sensing a transverse acceleration of the vehicle and providing an output signal which is representative of the sensed transverse acceleration and which has a neutral point representative of a transverse acceleration of 0 G; a vehicle-speed sensor sensing the speed of the vehicle and providing an output signal representative of the sensed vehicle speed; a steering sensor sensing the steering condition of the vehicle and providing a output signal representative of the sensed steering ondition; control means connected to receive the output signals from the acceleration sensor, the vehicle-speed sensor and the steering sensor for calculating the rolling state of the vehicle due to the transverse acceleration thereof and controlling the respective suspension units based on the calculated rolling state of the vehicle so as to suppress the rolling thereof; and drift compensation means connected to receive the output signals from the acceleration sensor, the vehicle-speed sensor and the steering sensor for compensating for a drift of the neutral point of the output signal of the acceleration sensor based on the above output signals.

The drift compensation means comprises: first means for calculating an average value of the sensed acceleration of the vehicle every given period of time; second means for modifying the thus calculated average value of the vehicle acceleration with an appropriate offset-compensation value; and third means for comparing the modified average value of the acceleration signal with the neutral point of the acceleration sensor output signal and renewing the offset-compensation value every given period of time so as to make the modified average acceleration value equal to the neutral point.

The above and other objects, features and advantages of the present invention will become more apparent from the following detailed description of a preferred embodiment of the invention when taken in conjunction with the accompanying drawings.

BRIEF DESCRIPTION OF THE DRAWINGS

FIG. 7 is a flow chart showing the drift-compensating operation of the control apparatus of FIG. 1.

BEST MODE FOR CARRYING OUT THE INVENTION

A control apparatus for a vehicular suspension system according to the present invention will now be described in detail with reference to the accompanying drawings.

Figure 1:
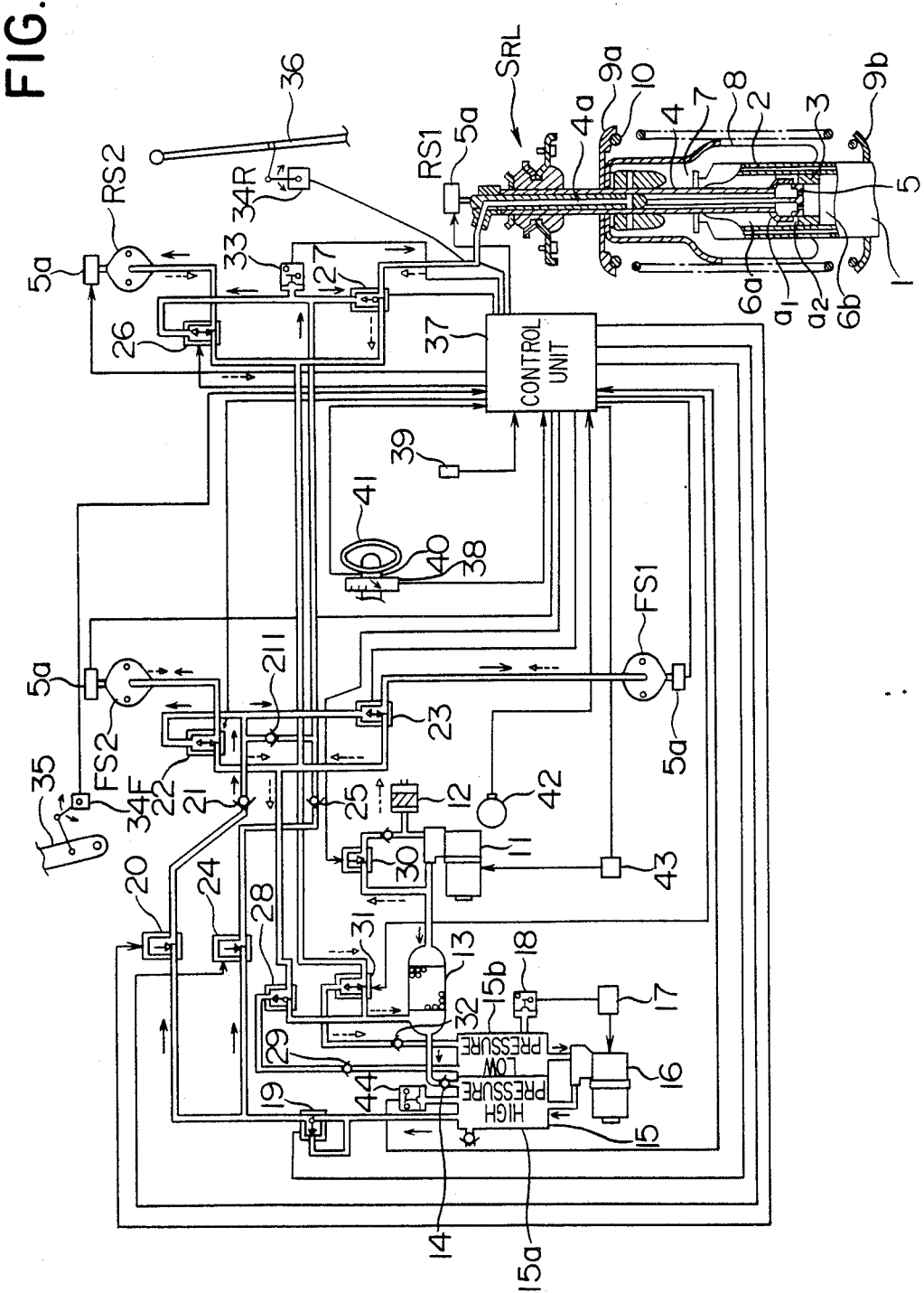
FIG. 1 is a circuit diagram showing the construction of a control apparatus for a vehicular suspension system in accordance with the present invention.

Referring first to FIG. 1, there is illustrated the general arrangement of the control apparatus of the invention which includes two front air suspension units FS1, FS2 and two rear air suspension units RS1, RS2 all of which are of substantially the same construction.

Each of the air suspension units FS1, FS2, RS1 and RS2 has a strut-type shock absorber 1 incorporated therein which comprises a cylinder 2 mounted on a front (or rear) wheel and a piston 3 which is slidably inserted in the cylinder 2 to define therein a first chamber 6a and a second chamber 6b on the opposite sides thereof. The piston 3 is fixedly connected with a piston rod 4 at its one end so that as the road wheels of the vehicle are caused to move up and down following road surface irregularities, the cylinder 2 is forced to vertically move with respect to the piston rod 3 so as to effectively absorb or alleviate shocks which are to be transmitted from a road surface to the body of the vehicle which is travelling thereon.

A change-over valve 5 is provided on the piston 3 for changing the damping force of each shock absorber 1. The change-over valve 5 is operatively connected with an actuator 5a so that it is selectively rotated by the actuator 5a to a first position in which the first and second chambers 6a and 6b defined in the cylinder 1 on the opposite sides of the piston 3 are placed in fluid communication with each other through an orifice a1 alone to make the shock absorber 1 in a hard-cushioning mode or to a second position in which the first and second chambers 6a and 6b are placed in fluid communication with each other through a pair of orifices a1 and a2 to provide a soft-cushioning mode. The operation of the actuator 5a is controlled by a control unit 37 which will be described later.

Disposed on the upper portion of the shock absorber 1 in a coaxial relation with the piston rod 4 is a primary pneumatic spring chamber 7 which acts as a vehicle-height adjusting means. The primary pneumatic spring chamber 7, a portion of which is constituted by a bellows 8, is in fluid communication with an axial passage 4a which is formed in the piston rod 4 so that air can be supplied to or discharged from the primary peumatic spring chamber 7 through the axial passage 4a, thereby permitting the vertical movement of the piston rod 4 relative to the cylinder 1.

A first downwardly directed spring retainer 9a is mounted on the top of the primary pneumatic spring chamber 7 and a second upwardly directed spring retainer 9b is provided on the outer peripheral surface of the shock absorber 1 with a coiled spring 10 being disposed under compression between these first and second spring retainers 9a and 9b for biasing the cylinder 2 of the shock absosrber 1 downwardly in a direction away from the primary pneumatic spring chamber 7.

A compressor 11 is provided for compressing atmospheric air fed therein through an air cleaner 12 and supplying the thus compressed air to a dryer 13 wherein the air from the compressor 11 is dried by drying means or agent such as silica gel and fed via a check valve 14 to a high pressure tank 15a of a reservoir 15 and stored therein. The reservoir 15 also has a low pressure tank 15b. These reservoir tanks 15a and 15b are connected with each other through a compressor 16 which is adapted to be driven to operate through a compressor relay 17. A pressure switch 18 is provided which is turned on to drive the compressor relay 17 when the pressure in the low pressure tank 15b increases above the atmospheric pressure, so that the compressor 16 is driven to suck air from the tank 15b and supply compressed air to the tank 15a, thereby always maintaining the tank 15b at a subatmospheric pressure.

The compressed air in the high pressure tank 15a is supplied to the respective suspension units FS1, FS2, RS1 and RS2 through distribution piping, as shown in FIG. 1 by arrows in solid lines. For example, compressed air is supplied from the high pressure tank 15a to the front suspension units FS1 and FS2 through a flow control valve 19 in the form of a three-way valve, a front air-supply solenoid valve 20 in the form of an on/off valve, a check valve 21, and a front right-side solenoid valve 22 or a front left-side solenoid valve 23. Similarly, compressed air is supplied from the high pressure tank 15a to the rear suspension units RS1 and RS2 through the flow control valve 19, a rear air-supply solenoid valve 24, a check valve 25, and a rear right-side solenoid valve 26 or a rear left-side solenoid valve 27. The portion of the distribution piping downstream of the check valve 21 is connected with the piping portion downstream of the check valve 25 through a conduit having a check valve 211 therein. On the other hand, air is discharged from the respective suspension units FS1, FS2, RS1 and RS2 to the outside atmosphere through the discharge paths as shown in FIG. 1 by arrows in broken lines. That is, air is first led from the front suspension units FS1 and FS2 to the low pressure tank 15b through the solenoid valves 22 and 23, a front discharge valve 28, and a pressure reserving valve 29, and then discharged from the low pressure tank 15b to the outside atmosphere through the solenoid valves 22 and 23, a front discharge valve 28, the dryer 13, a discharge solenoid valve 30, and the air cleaner 12. Likewise, air in the rear suspension units RS1 and RS2 is first led to the low pressure tank 15b through the rear solenoid valves 26 and 27, a rear discharge valve 31, and a rear pressure reserving valve 32, and then discharged from the low pressure tank 15b to the outside atmosphere through the rear solenoid valves 26 and 27, a rear discharge valve 31, the dryer 13, the discharge solenoid valve 30, and the air cleaner 12. In this connection, it is to be noted that if the pressure in the low pressure tank 15b of the reservoir 15 is lower than the pressure in the primary pneumatic spring chambers 7, the pressure reserving valves 29 and 32 are opened, whereas if the pressure in the low pressure tank 15b is equal to or higher than the pressure in the primary pneumatic spring chambers 7, the pressure reserving valves 29 and 32 are closed. The first and second rear pneumatic spring chambers 7 are in fluid communication with each other through a communication passage having a pressure switch 33 which sends an output signal to the control unit 37.

A vehicle-height sensing means is provided for sensing the height of the vehicle, and comprises a front vehicle-height sensor 34F mounted on a lower arm 35 of the front second (or right-side) suspension unit FS2 for sensing the height of the front portion of the vehicle, and a rear vehicle-height sensor 34R mounted on a lateral rod 36 of the rear first (left-side) suspension unit RS1 for sensing the height of the rear portion of the vehicle. Each of these sensors 34F and 34R is designed to sense the distance between the present vehicle height and a preset normal height level, and the distance between the present vehicle height and a preset low or high height level, and sends out two output signals representative of the distances as sensed in the above manner to the control unit 37.

In this connection, it is to be noted that a difference in the vehicle height between the front right-side portion and the rear left-side portion which lie on a diagonal line represents, after adjustment of the vehicle height in the longitudinal direction has been finished, an inclination in the transverse direction of the vehicle body. Thus, by means of the vehicle-height sensors 34F and 34R, it is possible to sense whether or not the vehicle body is level or horizontal. In this manner, it is possible to indirectly sense an inclination of the vehicle body due to the steering operation of an operator.

A speed sensor 38 is incorporated in a speedometer for sensing the travelling speed of the vehicle. The speed sensor 38 sends an output signal representative of the vehicle speed thus sensed to the control unit 37.

For the purpose of sensing a change in the attitude of the vehicle, there is povided a vehicle-attitude sensor 39 which is, in the illustrated embodiment, an acceleration sensor in the form of a differential transformer type G sensor (hereinafter referred to as a G sensor) for example. The G sensor 39 has characteristics in which the output voltage of the sensor 39 is 2.5 V at a neutral point of 0 G when the vehicle runs straight, increases therefrom when the vehicle is steered to make a righthand turn and decreases therefrom when the vehicle is steered to make a lefthand turn. The output voltage of the G sensor 39 differentiated by time is in proportion to the angular velocity of a steering wheel 41.

Also provided are a steering sensor 40 sensing the rotational speed or steering speed of the steering wheel 41 and a accelerator pedal sensor 42 sensing the amount or angle of depression imparted to an unillustrated accelerator pedal by the operator. The output signals of the steering sensor 40 and the accelerator pedal sensor 42 representative of the sensed steering speed and the sensed accelerator pedal depression amount or angle are fed to the control unit 37.

Figure 3A:
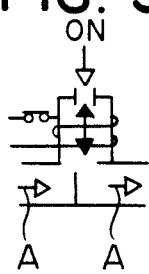
FIGS. 3(a) and 3(b) are schematic illustrations showing the operative (turn-on) condition and the inoperative (turn-off) condition, respectively, of a three-way solenoid valve employed in the control apparatus of FIG. 1.
Figure 4A:
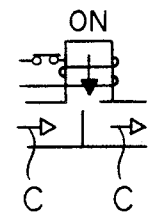
FIGS. 4(a) and 4(b) are schematic illustrations showing the operative (turn-on) condition and the inoperative (turn-off) condition, respectively, of an on/off solenoid valve employed in the control apparatus of FIG. 1.
Figure 3B:
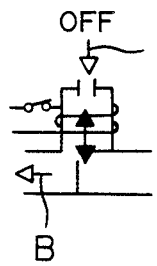
Figure 4B:
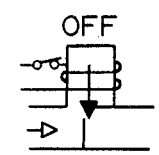

A compressor relay 43 for driving the compressor 11 is provided which is cntrolled by a control signal from the control unit 37. A pressure switch 44 is provided which is turned on when the pressure in the high-pressure reservoir tank 15a decreases below a predetermined value. When turned on, the pressure switch 44 sends an output signal to the control unit 37 so that the compressor relay 43 is actuated by a control signal from the control unit 37 to drive the compressor 11. By the operation of the compressor 11, compressed air is delivered to the high-pressure reservoir tank 15a until the pressure in the tank 15a rises above a predetermined level. In this regard, it should be noted that the opening and closing operations of the solenoid valves 20, 22, 23, 24, 26, 27 and 30 and the valves 19, 28 and 31 are effected by control signals from the control unit 37. Each of the solenoid valves 22, 23, 26 and 27 and the valves 19, 28 and 31 comprises a three-way valve which takes two different positions as illustrated in FIGS. 3(a) and 3(b). FIG. 3(a) shows a first or operative position in which the three-way valve is turned on or driven to operate so that compressed air flows in the directions as indicated by arrows A with white triangular heads. On the other hand, FIG. 3(b) shows a second or inoperative position in which the three-way valve is turned off or not driven so that compressed air flows through the valve in the directions as indicated by arrows B with white rectangular heads. Further, each of the solenoid valves 20, 24 and 30 comprises a two-way or on/off valve which takes two positions as illustrated in FIGS. 4(a) and 4(b). FIG. 4(a) shows a first or operative position in which the two-way valve is turned on to open so that compressed air flows in the directions as indicated by arrows C with white triangular heads. On the other hand, FIG. 4(b) shows a second or inoperative position in which the two-way valve is turned off to close so that the flow of compressed air is stopped.

The control unit 37 comprises control means connected to receive the output signals from the acceleration sensor, the vehicle-speed sensor and the steering sensor for calculating the rolling state of the vehicle due to a transverse acceleration thereof and controlling the respective suspension units FS1, FS2, RS1 and RS2 based on the calculated rolling state of the vehicle so as to suppress the rolling thereof, and drift compensation means connected to receive the output signals from the acceleration sensor, the vehicle-speed sensor and the steering sensor for compensating for a drift of the neutral point of the acceleration sensor output signal based on the above output signals.

Figure 5:
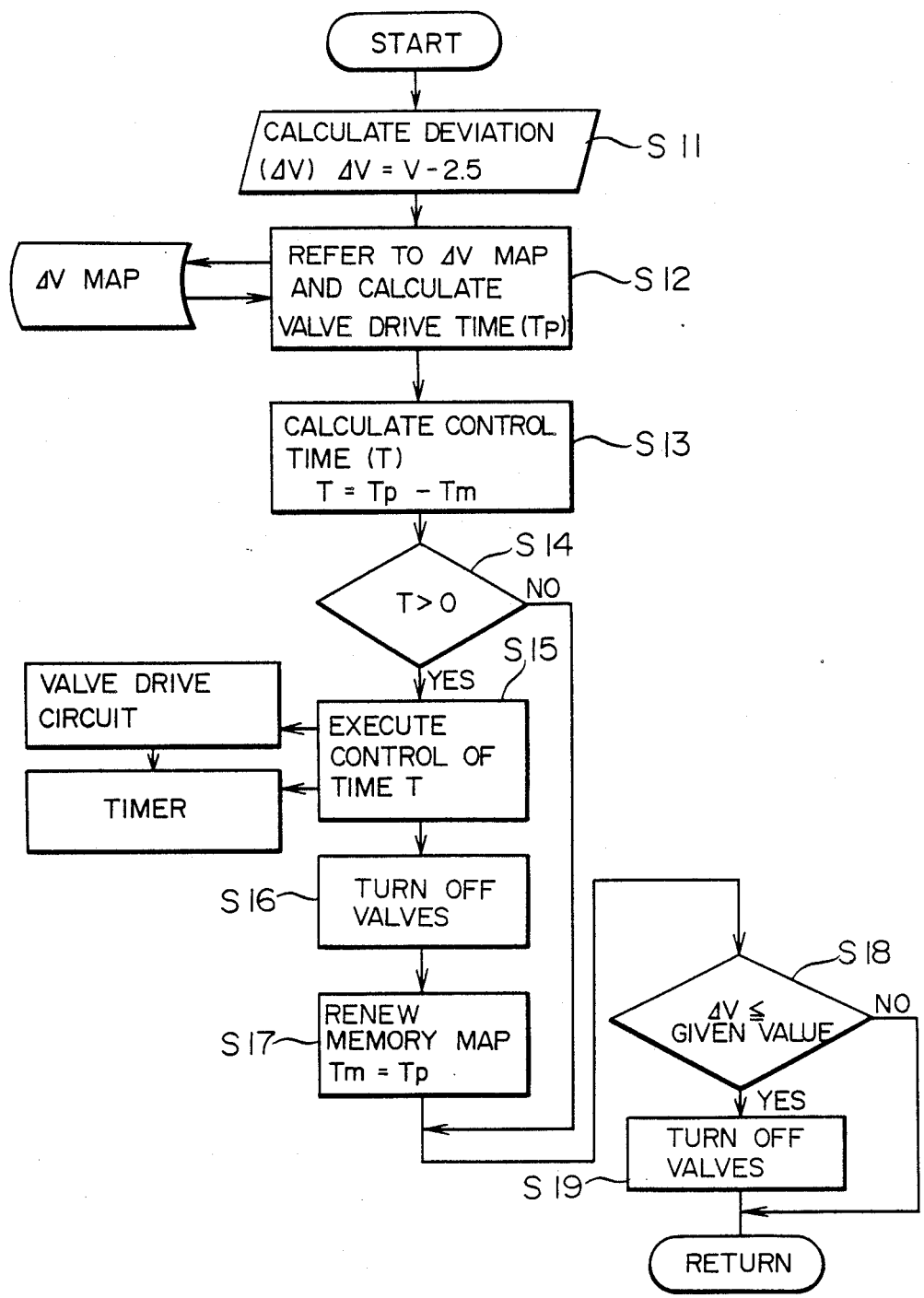
FIG. 5 is a flow chart showing the roll-suppressing operation of the control apparatus of FIG. 1.

Now, the roll-suppressing operation of the suspension control apparatus as constructed above will be described while referring to the flow chart of FIG. 5.

Figure 6:
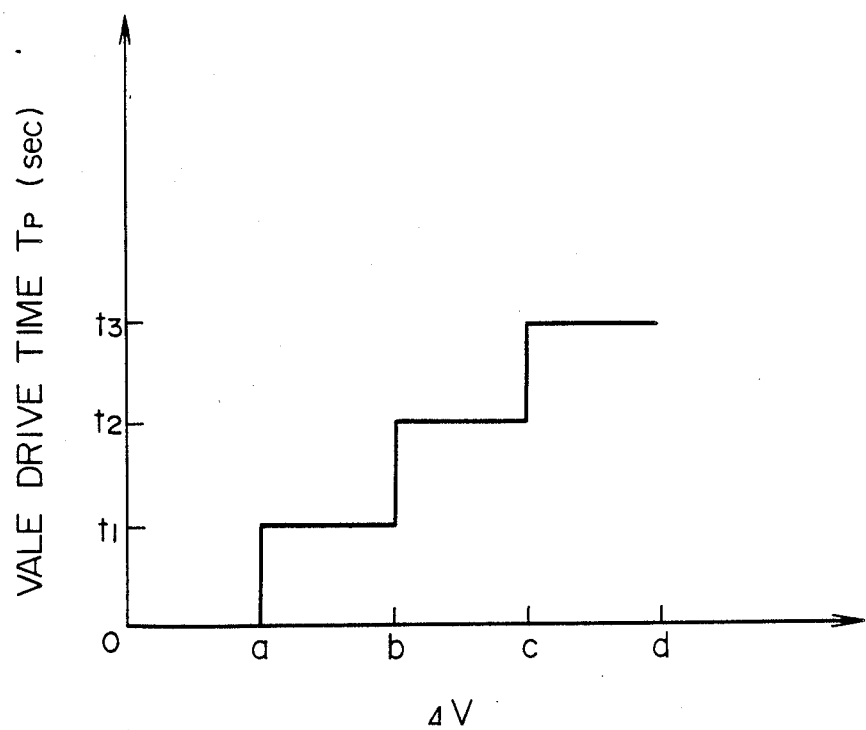
FIG. 6 is a graphic representation showing the relationship between the valve drive time Tp and the deviation V from a neutral point of the G sensor.

First in Step S11, the control unit 37 reads out the output voltage V of the G sensor 39 and calculates a deviation $\Delta V$ of the output voltage V from the neutral point which is 2.5 V; i.e., $\Delta V = V - 2.5$. In this regard, it is to be noted that $\Delta V > 0$ represents a leftward acceleration and $\Delta V < 0$ a rightward acceleration. Then in Step S12, the $\Delta V$ map, as illustrated in FIG. 6, which is stored in the control unit 37, is referred to so as to calculate an appropriate valve drive time $T_p$ which corresponds to the calculated deviation $\Delta V$ of the G sensor output voltage V. In Step S13, a control time or duration T is calculated by the following formula;

$$T = T_p - T_m$$

wherein $T_m$ represents a period of time for which the related valves were already driven to operate or open and which is stored in the memory map. Accordingly, if the control process proceeds to Step S13 for the first time, $T_m$ is zero and T is equal to $T_p$. Subsequently in Step S14, it is determined whether T is greater than zero (T>0). If it is determined that T is greater than zero (T>0), then in Step S15 valve control is effected for a time duration of T. In this case, what valves are driven to open is indicated in Table I below.

TABLE I

| | front supply valve (20) | rear supply valve (24) | front discharge valve (28) | front discharge valve (31) | supply control valve (19) | discharge solenoid valve (30) | front right solenoid valve (22) | front left solenoid valve (23) | rear right solenoid valve (26) | rear left solenoid valve (27) |
|---|---|---|---|---|---|---|---|---|---|---|
| roll control | | | | | | | | | | |
| right turn | | | | | | | | | | |
| start | O | O | X | X | X | X | O | X | O | X |
| hold | X | X | O | O | X | X | O | X | O | X |
| end | X | X | X | X | X | X | X | X | X | X |
| left turn | | | | | | | | | | |
| start | O | O | X | X | X | X | X | O | X | O |
| hold | X | X | O | O | X | X | X | O | X | O |
| end | X | X | X | X | X | X | X | X | X | X |
| nose dive control | | | | | | | | | | |
| start | O | X | X | X | X | X | X | X | O | O |
| hold | X | X | X | X | X | X | X | X | X | X |
| return | X | O | X | X | X | X | O | O | X | X |
| squat control | | | | | | | | | | |
| start | X | O | X | X | X | X | X | X | X | X |
| hold | X | X | X | X | X | X | X | X | X | X |
| return | O | X | X | X | X | X | X | X | O | O |
| height control (normal) | | | | | | | | | | |
| raise | O | O | X | X | O | X | X | X | X | X |
| lower | X | X | O | O | X | O | O | O | O | O |
| rapid height control | | | | | | | | | | |
| raise right and left suspensions disconnected | O | O | X | X | X | X | X | X | X | X |
| hold | X | X | O | O | X | X | O | X | O | X |

O: turned on
X turned off

For example, in the case of a rightward turn (i.e., $\Delta V > 0$), there is a tendency that the vehicle body is raised at the right side and lowered at the left side. In order to suppress this tendency, valves marked by O is drived to open for the control time T so that compressed air in the high-pressure reservoir tank 15a is supplied to the primary pneumatic spring chambers 7 of the front and rear left-side suspension units FS1 and RS1 via the flow control valve 19, the front and rear supply valves 20 and 24, the solenoid valves 23 and 27, thereby biasing the vehicle body in a direction to rise at the left side thereof. On the other hand, compressed air in the primary pneumatic spring chambers 7 of the front and rear right-side suspension units FS2 and RS2 is discharged to the low-pressure reservoir tank 15b via the front and rear discharge valves 28 and 31, thus biasing the vehicle body in a direction to lower at the right side thereof. In this manner, the tendency of the vehicle body to be transversely inclined by centrifugal force during a rightward turn of the vehicle is effectively suppressed.

After the control time T is up, the control process proceeds to Step S16 in which the front supply valve 20 and the rear supply valve 24 are turned off to close so that the supply of compressed air to the primary pneumatic spring chambers 7 of the front and rear left-side suspension units FS1 and RS1 is stopped. At the same time, the front and rear discharge valves 28 and 31 are turned on to stop the discharge of compressed air from the primary pneumatic spring chambers 7 of the front and rear right-side suspension units FS2 and RS2. As a result, the attitude of the vehicle body as adjusted above is maintained.

Subsequently in Step S17, the map memory stored in the control unit 37 is renewed. That is, the period of time $T_p$ for which the related valves were driven to open is freshly stored as $T_m$ in the control unit 37 ($T_m = T_p$).

Thereafter in Step S18, it is determined whether $\Delta V$ is not greater than a given value. If $\Delta V$ is greater than the given value during a turning movement of the vehicle for example, the next step S19 of stopping the attitude control is skipped and the control process returns from Step S18 to the first Step S11. On the other hand, in Step S18, if it is determined that $\Delta V$ is not greater than the given value, the control process proceeds to Step S19 wherein the related valves are all turned off to remove or stop the attitude control performed in Step S16. Thereafter, the control process returns from Step S19 to the first Step 11, and a new valve drive time $T_p$ is calculated by the use of the now renewed $\Delta V$ map in Step S12.

Although in the above embodiment, the roll-suppressing control is effected based on $\Delta V$ alone, it is possible to perform such a roll-suppressing control on the basis of a valve drive time $T_p$ which is calculated based on the direction (i.e., rightward or leftward) of $\Delta V$, the vehicle speed sensed by the speed sensor 38 and the angular velocity of the steering wheel 41 sensed by the steering sensor 40 using a different map stored in the contorl unit 37. In this case, the Step of calculating such a valve control time $T_p$ corresponds to Step S12 in FIG. 5. Also in this case, the determination as to whether or not the control process returns to Step S11 is effected in the same manner as in Step S18 in FIG. 5.

Figure 2:
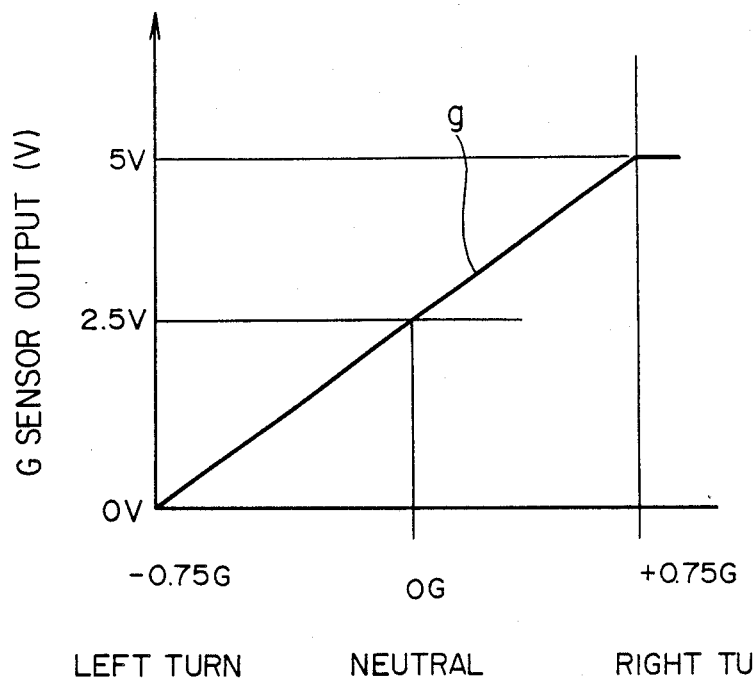
FIG. 2 is a graphic representation showing the output voltage characteristics of a G sensor employed in the control apparatus of FIG. 1.

Further, in the above-described embodiment, the critical factor for determining the starting and ending points of the valve control operation is the value of $\Delta V$ which is calculated by subtracting 2.5 V, which corresponds to the neutral point (0 G) of transverse acceleration of the vehicle, from the output voltage V of the G sensor 39. In this case, however, the output V of the G sensor 39 is liable to subject to a gradual drift over an extended period of time resulting from temperature change, length of use, variation in normal vehicle attitude and the like, as a consequence of which the neutral point of G sensor output drifts or changes from 2.5 V to a value of 2.5 V+$V_{os}$ V (an offset). Thus, the value of $\Delta V$ unavoidably involves an error which corresponds to the offset $V_{os}$. Accordingly, the roll-suppressing control, if carried out based on the value of $\Delta V$ involving the error, will become unbalanced between a rightward and a leftward turn, making it difficult to fulfill the intended function in a satisfactory manner. In essence, the output of the G sensor 39 is a transient signal which changes continuously, and sometimes deviates greatly from a constant value, but on the other hand, the rate of change of the G sensor output, i.e., the gradient of line g in FIG. 2, is highly accurate. Therefore, modifying the output voltage of the G sensor 39 by compensating for the offset $V_{os}$ from the neutral point in an appropriate manner, it is possible to perform the roll-suppressing control in an optimal manner at all times. To this end, the drift compensation means of the control unit 37 comprises first means for calculating an average value of the sensed acceleration of the vehicle every given period of time, second means for modifying the thus calculated average value of the vehicle acceleration with an appropriate offset-compensation value, and third means for comparing the modified average value of the acceleration signal with the neutral point of the acceleration sensor output signal and renewing the offset-compensation value every given period of time so as to make the modified average acceleration value equal to the neutral point.

Next, such a compensation for the offset will be described below while referring to the flow chart of FIG. 7.

An offset compensation is carried out based on a neutral point of G sensor output which is determined by the control unit 37 and at which rightward and leftward accelerations are neutralized with the attitude of the vehicle being horizontal. If the vehicle is on a horizontal surface of a road, the neutral point of G sensor output is stable so that compensation for the neutral point can be readily carried out. In this regard, however, it is difficult to confirm that the vehicle is on a horizontal road surface. To this end, according to the present invention, the following conditions are taken into consideration as a means for making such confirmation.

(1) The speed of the vehicle is not less than a given speed, e.g. 20 Km/h (Step S101 in FIG. 7).

(2) The steering angle of the steering wheel 41 is not less than a given angle, e.g. 5 degrees in the right-hand (clockwise) or left-hand (counterclockwise) direction (Step S102 in FIG. 7).

(3) The absolute value of the rate of change of the G sensor output is not greater than a given value, e.g. 0.2 G (Step S103 in FIG. 7).

If the above conditions (1) through (3) continue for a given period of time, for example 15 seconds, it is determined that averaging of the G sensor output V is over in Step S104, and the control process proceeds to Step S105 wherein the sum of the averaged value $V_a$ of the G sensor output V and the previous offset $V_{os}$ is compared with 2.5 V. On the other hand, if it is determined in Step S104 that all the above conditions (1) through (3) do not continue for 15 seconds, the control process proceeds from Step S104 to Step S106 wherein an averaged value $V_a$ of the G sensor output V for a period of 15 seconds is calculated. Turning back to Step S105, if $V_a+V_{os}-2.5<0$, then the control process proceeds to Step S107 wherein $V_{os}$, which is still of a smaller value than required, is renewed as $V_{os}=V_{os}+0.01$. On the other hand, if $V_a+V_{os}-2.5>0$, then the control process proceeds to Step S109 wherein $V_{os}$, which is still of a larger value than required, is renewed as $V_{os}=V_{os}-0.01$. Further, if $V_a+V_{os}-2.5=0$, the control process proceeds to Step S108 wherein $V_{os}$ remains unchanged or is not renewed. Thereafter, the control process returns Step S107, S108 or S109 to Step S101.

Moreover, if at least one of the above conditions (1) through (3) is not satisfied, the control process proceeds to Step S110 wherein the averaging of the G sensor output V is stopped and an unillustrated timer for counting the given period of time (e.g., 15 seconds) is reset.

From the above, it will be understood that even if an average $V_a$ of G sensor output V deviates from the neutral point (0 G), it is possible to compensate for the value of $V_a+V_{os}$ so as to be near the true neutral point by successively modifying the value of $V_{os}$ in an appropriate manner.

Although not employed in the above embodiments, the above modification can of course be made with the same effects by using, as a means for sensing the steering condition, the output signals of the vehicle-height sensors which are disposed for the four road wheels, the front or rear right and left road wheels, or on the diagonal lines passing through the front right and the rear left road wheels or the front left and the rear right road wheels, or using a hydraulic pressure signal of a power cylinder of a power steering system, or a reset signal which is issued by a service switch when it is reset. Further, it is possible to store the value of $V_{os}$ in the control unit 37 even when the key or ignition switch of the vehicle is turned off, so that the next roll-suppressing control process can be performed using $V_{os}$ thus stored upon subsequent turning on of the key or ignition switch.

Also, the roll-suppressing control can of course be effected with the similar effects as described above by controlling the damping force or spring constant of each suspension unit, or the operation of a stabilizer.

We claim:

1. A control apparatus for a vehicular suspension system comprising:

a plurality of suspension units each disposed between a road wheel and the body of a vehicle for suspending the corresponding road wheel from the vehicle body;

an acceleration sensor sensing a transverse acceleration of the vehicle and providing an output acceleration signal which is representative of the sensed transverse acceleration and which has a neutral point representative of a transverse acceleration of 0 G;

a vehicle-speed sensor sensing the speed of the vehicle and providing an output signal representative of the sensed vehicle speed;

a steering sensor sensing the steering condition of the vehicle and providing an output signal representative of the sensed steering ondition;

control means connected to receive the output signals from said acceleration sensor, said vehicle-speed sensor and said steering sensor for calculating the rolling state of the vehicle due to the transverse acceleration thereof and controlling said respective suspension units based on the calculated rolling state of the vehicle so as to suppress the rolling thereof; and drift compensation means connected to receive the output signals from said acceleration sensor, said vehicle-speed sensor and said steering sensor for compensating for a drift of the neutral point of the output signal of said acceleration sensor based on said output signals.

2. A control apparatus for a vehicular suspension system as claimed in claim 1, wherein said drift compensation means comprises:

first means for calculating an average value of the sensed accelerations of the vehicle every given period of time;

second means for modifying the thus calculated average value of the vehicle accelerations with an appropriate offset-compensation value; and third means for renewing the offset-compensation value every given period of time so as to make the modified average acceleration value equal to the neutral point.

3. A control apparatus for a vehicular suspension system as claimed in claim 1 or 2, wherein said drift compensation means executes the drift compensation when the angle of steering of the vehicle sensed by said steering sensor within a predetermined period of time is within a predetermined angular range.

4. A control apparatus for a vehicular suspension system as claimed in claim 1, wherein said drift compensation means executes the drift compensation when the transverse acceleration of the vehicle sensed by said acceleration sensor within a predetermined period of time is within a predetermined acceleration range.

5. A control apparatus for a vehicular suspension system as claimed in claim 1, wherein said drift compensation means executes the drift compensation when the speed of the vehicle sensed by said vehicle-speed sensor is greater than a predetermined speed level.

6. A control apparatus for a vehicular suspension system as claimed in claim 2, wherein the offset compensation value is stored in said control means when an ignition key switch of the vehicle is turned off so that the drift compensation is started from the previous offset-compensation value thus stored.

* * * * *